United States Patent
Hablot et al.

(10) Patent No.: US 11,827,776 B2
(45) Date of Patent: Nov. 28, 2023

(54) PROPYLENE-BASED COMPOSITIONS COMPRISING CARBON FIBERS AND A THERMOPLASTIC POLYOLEFIN ELASTOMER

(71) Applicant: Dow Global Technologies LLC, Midland, MI (US)

(72) Inventors: Elodie Hablot, Horgen (CH); Russell P. Barry, Schänis (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/692,118

(22) Filed: Mar. 10, 2022

(65) Prior Publication Data

US 2022/0195164 A1    Jun. 23, 2022

Related U.S. Application Data

(63) Continuation of application No. 16/324,853, filed as application No. PCT/US2017/046226 on Aug. 10, 2017, now abandoned.

(60) Provisional application No. 62/374,133, filed on Aug. 12, 2016.

(51) Int. Cl.

| C08L 23/12 | (2006.01) |
|---|---|
| C08L 23/16 | (2006.01) |
| C08L 23/08 | (2006.01) |
| C08L 51/06 | (2006.01) |
| C08L 53/00 | (2006.01) |
| C08K 7/06 | (2006.01) |
| C08K 3/04 | (2006.01) |

(52) U.S. Cl.
CPC ............... *C08L 23/12* (2013.01); *C08K 7/06* (2013.01); *C08L 23/0815* (2013.01); *C08L 23/16* (2013.01); *C08L 51/06* (2013.01); *C08L 53/00* (2013.01); *C08K 3/04* (2013.01); *C08L 2205/03* (2013.01); *C08L 2205/08* (2013.01); *C08L 2207/04* (2013.01)

(58) Field of Classification Search
CPC .......... C08L 23/12; C08L 23/16; C08L 23/08; C08L 51/06; C08L 53/00
USPC ........................................................ 524/495
See application file for complete search history.

(56) References Cited

U.S. PATENT DOCUMENTS

| 7,079,297 | B2 | 7/2006 | Sakai | |
|---|---|---|---|---|
| 7,582,696 | B2 | 9/2009 | Nakayama et al. | |
| 8,618,214 | B2 | 12/2013 | Tsou et al. | |
| 8,716,387 | B2 | 5/2014 | Posch et al. | |
| 9,382,410 | B2 | 7/2016 | Bernreitner et al. | |
| 10,435,549 | B2 | 10/2019 | Prieto | |
| 2001/0053816 | A1 | 12/2001 | Kinoshita et al. | |
| 2005/0143510 | A1 | 6/2005 | Nakayama et al. | |
| 2009/0105374 | A1* | 4/2009 | Wu | C08L 23/0807 524/427 |
| 2014/0356612 | A1 | 12/2014 | Sano et al. | |
| 2015/0315365 | A1 | 11/2015 | Aoki et al. | |
| 2016/0060440 | A1 | 3/2016 | Prieto | |
| 2017/0321019 | A1 | 11/2017 | Fujita et al. | |

FOREIGN PATENT DOCUMENTS

| CN | 104151708 | | 11/2014 | |
|---|---|---|---|---|
| CN | 104562299 | * | 4/2015 | |
| JP | 2001106835 | | 4/2001 | |
| JP | 2014141663 | | 8/2014 | |
| WO | 2010119480 | | 10/2010 | |
| WO | WO-2010119480 | A1 * | 10/2010 | ............ C08F 255/02 |
| WO | WO-2016076411 | A1 * | 5/2016 | ................ C08J 5/04 |

OTHER PUBLICATIONS

Dow, Data Technical SHeet Engage 8842 Polyolefiin Elastomer, Published 2000, pp. 1-2 (Year: 2000).*
Dow, Data Technical Sheet Engage 8842 Polyolefin Elastomer, Published 2000, pp. 1-2.
Nogueira, "Effect of the Interfacial Adhesion on the Tensile and Impact Properties of Carbon Fiber Reinforced Polypropylene Matrices" 2005, vol. 8, No. 1, p. 81-89.
PCT/US2017/046226, International Preliminary Report on Patentability dated Feb. 12, 2019.
PCT/US2017046226, International Search Report and Written Opinion dated Oct. 30, 2017.

* cited by examiner

*Primary Examiner* — Deve V Hall

(57) ABSTRACT

The present disclosure relates to a composition comprising: (A) from 30 wt % to 94 wt % of a propylene component including at least one propylene-based polymer having a propylene content of at least 75 wt %, based on the total weight of the propylene-based polymer, and a melt flow rate of at least 10 g/10 minutes as measured by ISO 1133 at 230° C./2.16 kg; (B) from 1 wt % to 50 wt % of a carbon fiber component; (C) from 5 wt % to 69 wt % of a thermoplastic polyolefin elastomer; and, optionally, (D) from 0.1 wt % to 15 wt % of a compatibilization agent.

11 Claims, No Drawings

PROPYLENE-BASED COMPOSITIONS COMPRISING CARBON FIBERS AND A THERMOPLASTIC POLYOLEFIN ELASTOMER

CROSS REFERENCE TO RELATED APPLICATIONS

This Application is a continuation of U.S. application Ser. No. 16/324,853 filed on Feb. 11, 2019, which is a § 371 of International Application No. PCT/US2017/046226 filed on Aug. 10, 2017, which claims priority to U.S. Provisional Application No. 62/374,133 filed on Aug. 12, 2016.

FIELD

Embodiments relate to propylene-based compositions that include carbon fibers and at least one thermoplastic polyolefin elastomer.

INTRODUCTION

One of the key challenges in the automotive industry is the desire to reduce the weight of a vehicle in order to decrease fuel consumption. Decreased fuel consumption would result in reduced pollution and would benefit the environment. Carbon fibers, with their low density (around 1.78 g/cc) and high stiffness, offer an interesting source of substitution to conventional glass fibers (density of around 2.60 g/cc) and high strength steel (density of around 7.80 g/cc) currently used in the automotive industry. However, carbon fibers present impact performance challenges as they are very brittle and break down to small fibers after being compounded or injection molded into parts. Accordingly, a need exists for carbon fiber solutions that provide high stiffness and good impact performance while retaining a high and commercially interesting modulus.

A further challenge in the automotive industry is thermal expansion of polypropylene-based compounds. In the automotive industry, it is important to limit dimensional changes with temperature fluctuations. While glass fibers and talc are typical fillers used to limit the Coefficient of Linear Thermal Expansion (CLTE) in polypropylene-based compounds, a need exists for solutions for achieving even lower CLTE values.

SUMMARY

In certain embodiments, the present disclosure relates to a composition comprising:
(A) from 30 wt % to 94 wt % of a propylene component including at least one propylene-based polymer having a propylene content of at least 75 wt %, based on the total weight of the propylene-based polymer, and a melt flow rate of at least 10 g/10 minutes as measured by ISO 1133 at 230° C./2.16 kg;
(B) from 1 wt % to 50 wt % of a carbon fiber component; and
(C) from 5 wt % to 69 wt % of a thermoplastic polyolefin elastomer.

In further embodiments of the present disclosure, the composition described above may optionally include (D) from 0.1 wt % to 15 wt % of a compatibilization agent.

DETAILED DESCRIPTION

Definitions

The numerical ranges disclosed herein include all values from, and including, the lower value and the upper value. For ranges containing explicit values, any subrange between any two explicit values is included. As used with respect to a chemical compound, unless specifically indicated otherwise, the singular includes all isomeric forms and vice versa.

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all components and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

"Composition" and like terms is a mixture of two or more components. Included in compositions are pre-reaction, reaction and post-reaction mixtures, the latter of which will include reaction products and by-products, as well as unreacted components of the reaction mixture and decomposition products, if any, formed from the one or more components of the pre-reaction or reaction mixture.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. "Interpolymer," as used herein, refers to a polymer having polymerized therein at least two monomers and includes, for example, copolymers, terpolymers and tetrapolymers.

The terms "ethylene/α-olefin polymer" and "propylene/α-olefin polymer" are indicative of copolymer as described above prepared from polymerizing ethylene or propylene, respectively, and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

As used herein, "alpha-olefin" or "α-olefin" refer to olefins or alkenes with the chemical formula $C_xH_{2x}$, distinguished by having a double bond at the primary or alpha (a) position. As used herein, alpha-olefins include, but are not limited to, ethylene, propylene, 1-butene, 1-pentene, 1-hexene, 4-methyl-1-pentene, 1-heptene, 1-octene, 1-nonene, 1-decene, 1-dodecene, and the like.

The terms "ethylene/α-olefin interpolymer" and "ethylene/α-olefin multi-block interpolymer," as used herein, refer to an interpolymer that comprises a polymerized ethylene monomer and at least one α-olefin.

"Blend," "polymer blend," and like terms is a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Units derived from ethylene," "ethylene content," and like terms mean the units of a polymer formed from the polymerization of ethylene monomers. "Units derived from α-olefin," "alpha-olefin content," "α-olefin content," and like terms mean the units of a polymer formed from the polymerization of specific α-olefin monomers. "Units derived from propylene," "propylene content," and like terms mean the units of a polymer formed from the polymerization of propylene monomers.

"Propylene based polymer" and like terms mean a polymer that comprises a majority weight percent of polymerized propylene monomer, also referred to as units derived from propylene (based on the total amount of polymerizable monomers), and optionally comprises at least one polymerized comonomer different from propylene (such as at least one selected from a $C_2$ and $C_{4-10}$ α-olefin) so as to form a propylene-based interpolymer. For example, when the propylene-based polymer is a copolymer, the propylene content is greater than 50 wt %, based on the total weight of the copolymer.

"Ethylene based polymer" and like terms mean a polymer that comprises a majority weight percent polymerized ethylene monomer, also referred to as units derived from ethylene (based on the total weight of polymerizable monomers), and optionally may comprise at least one polymerized comonomer different from ethylene (such as at least one selected from a C3-10 α-olefin) so as to form an ethylene-based interpolymer. For example, when the ethylene-based polymer is a copolymer, the amount of ethylene is greater than 50 wt %, based on the total weight of the copolymer.

The term "polyethylene" includes homopolymers of ethylene and copolymers of ethylene and one or more C3-8 α-olefins in which ethylene comprises at least 50 mole percent. The term "polypropylene" includes homopolymers of propylene, such as isotactic polypropylene, atactic polypropylene, syndiotactic polypropylene, and copolymers of propylene and one or more C2 and C4-8 α-olefins in which propylene comprises at least 50 mole percent.

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline ethylene polymers typically have, but are not limited to, densities of 0.89 g/cc to 0.97 g/cc and melting points of 75° C. to 140° C. Crystalline propylene polymers may have, but are not limited to, densities of 0.88 g/cc to 0.91 g/cc and melting points of 100° C. to 170° C.

The term "amorphous" refers to a polymer lacking a crystalline melting point as determined by differential scanning calorimetry (DSC) or equivalent technique.

The term "isotactic" is defined as polymer repeat units having at least 70 percent isotactic pentads as determined by $^{13}$C-NMR analysis. "Highly isotactic" is defined as polymers having at least 90 percent isotactic pentads.

Propylene Component

The composition includes from 30 wt % to 94 wt % (e.g., from 35 wt % to 90 wt %, from 40 wt % to 85 wt %, from 40 wt % to 80 wt %, from 45 wt % to 75 wt %, from 45 wt % to 70 wt %, and/or from 45 wt % to 65 wt %) of a propylene component. The propylene component includes at least one propylene based polymer having a propylene content of at least 50 wt % (e.g., at least 75 wt %, at least 80 wt %, at least 85 wt %, at least 90 wt %, at least 95 wt %, and/or at least 98 wt %), based on the total weight of the propylene based polymer. The propylene based polymer may consist of heterogeneous polypropylene or homogeneous polypropylene.

The melt flow rate of the propylene based polymer may be from 0.1 g/10 min to 500 g/10 min according to ASTM D-1238 or ISO 1133 at 230° C., 2.16 kg (e.g., from 1 g/10 min to 100 g/10 min, from 10 g/10 min to 100 g/10 min, from 20 g/10 min to 75 g/10 min, etc.). In certain embodiments, the melt flow rate of the propylene based polymer may be at least 10 g/10 min according to ASTM D-1238 or ISO 1133 at 230° C., 2.16 kg. The density of the propylene based polymer may be, in accordance with ASTM D792 or ISO 1183, from 0.850 g/cc to 0.950 g/cc (e.g., from 0.875 g/cc to 0.925 g/cc, from 0.880 g/cc to 0.920 g/cc, and/or from 0.890 g/cc to 0.910 g/cc). The flexural modulus of the propylene based polymer may be, in accordance with ASTM D790 or ISO 178, from 500 MPa to 5000 MPa (e.g., from 1000 MPa to 3000 MPa, from 1500 MPa to 2500 MPa and/or from 1600 MPa to 2000 MPa).

The propylene based polymer may be a propylene homopolymer, a propylene based copolymer or interpolymer, a random copolymer polypropylene (RCPP), a high density polypropylene (HDPP), a heterophasic polypropylene, an impact copolymer polypropylene (e.g., homopolymer propylene modified with at least one elastomeric impact modifier) (ICPP), a high impact polypropylene (HIPP), a high melt strength polypropylene (HMS-PP), an isotactic polypropylene (iPP), a syndiotactic polypropylene (sPP), or a combination thereof. In exemplary embodiments, the propylene based polymer may be in the isotactic form of homopolymer polypropylene, although other forms of polypropylene may be used (e.g., syndiotactic or atactic). In exemplary embodiments, the propylene based polymer may be a polypropylene homopolymer or a polypropylene copolymer comprising not more than 15 wt % (e.g., not more than 10 wt %, not more than 8 wt %, not more than 5 wt %, and/or not more than 2 wt %) of a C2-C10 alpha-olefin other than propylene. In exemplary embodiments, the propylene based polymer serves as a polymer matrix (e.g., polypropylene matrix) to which further components may be added or dispersed.

Exemplary propylene-based polymers are formed by means within the skill in the art, for example, using single site catalysts (metallocene or constrained geometry) or Ziegler natta catalysts. Exemplary comonomers for polymerizing with propylene include ethylene, 1-butene, 1 pentene, 1-hexene, 1-heptene, 1-octene, 1-nonene, 1-decene, 1-undecene, 1 dodecene, as well as 4-methyl-1-pentene, 4-methyl-1-hexene, 5-methyl-1-hexene, vinylcyclohexane, and styrene. Exemplary comonomers include ethylene, 1-butene, 1-hexene, and 1-octene. Exemplary propylene based interpolymers include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene. Optionally, the propylene-based polymer includes a monomer having at least two double bonds such as dienes or trienes. Other unsaturated comonomers include, e.g., 1,3-pentadiene, norbornadiene, and dicyclopentadiene; C8-40 vinyl aromatic compounds including styrene, o-, m-, and p-methylstyrene, divinylbenzene, vinylbiphenyl, vinylnaphthalene; and halogen-substituted C8-40 vinyl aromatic compounds such as chlorostyrene and fluorostyrene.

In exemplary embodiments, the propylene-based polymer may be a propylene-alpha-olefin copolymer, which is characterized as having substantially isotactic propylene sequences. "Substantially isotactic propylene sequences" means that the sequences have an isotactic triad (mm) measured by $^{13}C$ NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}C$ NMR spectra.

In certain embodiments, the propylene/α-olefin copolymers are further characterized as containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term "long chain branch," as used herein, refers to a chain length greater than that resulting from the incorporation of the comonomer into the polymer backbone. Furthermore, the term "long chain branch" refers to a chain length of at least one carbon more than a short chain branch, and "short chain branch," as used herein, refers to a chain length of two carbons less than the number of carbons in the comonomer. For example, a propylene/1-octene interpolymer has backbones with long chain branches of at least seven (7) carbons in length, but these backbones also have short chain branches of only six (6) carbons in length.

Further parameters of the propylene based polymers (e.g., molecular weight, molecular weight distribution, melting temperature, impact strength, tensile properties, etc.) will be known by those of ordinary skill in the art based on the present disclosures and can be determined by methods known in the polymer art.

Carbon Fiber Component

The composition includes from 1 wt % to 50 wt % (e.g., from 2 wt % to 40 wt %, from 2 wt % to 35 wt %, and/or from 5 wt % to 30 wt %) of a carbon fiber component. In exemplary embodiments, the carbon fiber component comprises chopped carbon fibers derived from recycled waste. The chopped carbon fibers may be produced by any process or means known to one of ordinary skill in the art. In a non-limiting, exemplary embodiment, the chopped carbon fibers are manufactured from a polyacrylonitrile (PAN) precursor via oxidation at around 200-300° C., carbonization at around 1200-1400° C., surface treatment, sizing, winding as a continuous carbon fiber tow, and cutting into chopped carbon fibers. In further exemplary embodiments, the chopped carbon fibers are produced by creating a weave from continuous carbon fiber and using the weave in a molding process followed by cutting the edge trim and using that as a source of chopped fiber.

In certain embodiments, the chopped carbon fibers have a fiber length of 6 mm to 12 mm prior to any processing (e.g., molding). In exemplary embodiments, the chopped carbon fibers have a fiber length of 6 mm prior to any processing (e.g., molding). In certain embodiments, the carbon fiber component is comprised of short carbon fibers and long carbon fibers. In certain embodiments, the chopped carbon fibers have a filament diameter of between 5 microns and 15 microns. In certain embodiments, the chopped carbon fibers have a density from 0.170 g/cc to 0.185 g/cc (e.g., from 0.175 g/cc to 0.181 g/cc) in accordance with ISO 10119. In certain embodiments, the chopped carbon fibers have a tensile strength from 1000 MPa to 6000 MPa (e.g., from 3500 MPa to 5500 MPa, from 4000 MPa to 5000 MPa and/or from 4000 MPa to 4500 MPa) in accordance with ISO 10618. In certain embodiments, the chopped carbon fibers have a tensile modulus from 100 GPa to 500 GPa (e.g., 200 GPa to 300 GPa, from 210 GPa to 280 GPa and/or from 220 GPa to 250 GPa) in accordance with ISO 10618. In certain embodiments, the chopped carbon fibers have an elongation at break from 1% to 3% (e.g., from 1.5% to 2.1%, from 1.6% to 2% and/or from 1.7% to 1.9%) in accordance with ISO 10618. In certain embodiments, the chopped carbon fibers have a bulk density from 300 g/l to 600 g/l in accordance with ISO 10119.

The chopped carbon fibers may be coated with various sizings. Exemplary sizings for the chopped carbon fibers of the present disclosure include polyurethane-based emulsions, epoxy-based emulsions, phenoxy-based emulsions, epoxy- and phenoxy-based emulsions, aromatic polymer based emulsions, glycerin-based emulsions, hydrocarbon-based emulsions, polyamide-based emulsions, and/or combinations thereof. In certain embodiments, the chopped carbon fibers have a sizing content from 0.5 wt % to 10 wt % (e.g., from 1 wt % to 5 wt %).

In certain embodiments, the carbon fiber component comprises chopped carbon fibers commercially available from, for example, SGL Group (e.g., SIGRAFIL® carbon fibers), DowAksa, Toray (e.g., TORAYCA™ carbon fibers), etc.

Thermoplastic Polyolefin Elastomer (TPE)

The composition may include from 5 wt % to 69 wt % (e.g., from 10 wt % to 50 wt %, from 15 wt % to 30 wt %, and/or from 17 wt % to 25 wt %) of at least one thermoplastic polyolefin elastomer. In certain embodiments, the TPE component provides toughness to the composition. In certain embodiments, the TPE component is a polyolefin (PO) that (1) has the properties of an elastomer, i.e., the ability to be stretched beyond its original length and retract to substantially its original length when released, and (2) can be processed like a thermoplastic, i.e., to soften when exposed to heat and return to substantially its original condition when cooled to room temperature.

In certain embodiments, the compositions of the present disclosure comprise a matrix polymer toughened with at least one thermoplastic polyolefin elastomer, the matrix polymer being the propylene component described above. Suitable TPEs may be any elastomer with sufficient polypropylene compatibility and sufficiently low enough glass transition temperature to impart impact toughness to the propylene component. Nonlimiting examples of suitable TPE's include styrenic block copolymers (e.g., SEBS block copolymers), ethylene/α-olefin (i.e., ethylene-based) interpolymers (e.g., ENGAGE™ and AFFINITY™ elastomers and plastomers), ethylene/α-olefin multi-block interpolymers (OBCs) (e.g., INFUSE™), propylene-based olefin block copolymers (e.g., INTUNE™), and propylene/α-olefin (i.e., propylene-based) interpolymers (e.g. VERSIFY™ plastomers and elastomers).

In exemplary embodiments of the composition of the present disclosure, the TPE component includes ethylene/

α-olefin interpolymers and/or ethylene/α-olefin multi-block interpolymers. In exemplary embodiments of the composition of the present disclosure, the TPE component includes ethylene/α-olefin interpolymers and/or ethylene/α-olefin multi-block interpolymers and further includes styrenic block copolymers and/or propylene-based plastomers and elastomers.

The ethylene/α-olefin interpolymers used as toughening elastomers are preferably copolymers of ethylene with at least one $C_3$-$C_{20}$ α-olefin. Copolymers of ethylene and a $C_3$-$C_{20}$ α-olefin are especially preferred. The copolymers may further comprise $C_4$-$C_{18}$diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin copolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$hydrocarbyl or cyclohydrocarbyl groups. Also included are mixtures of such olefins as well as mixtures of such olefins with $C_4$-$C_{40}$ diolefin compounds.

Examples of α-olefin or olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high. Exemplary interpolymers include ethylene/butene (EB) copolymers, ethylene/hexene-1 (EH), ethylene/octene (EO) copolymers, ethylene/alpha-olefin/diene modified (EAODM) interpolymers such as ethylene/propylene/diene modified (EPDM) interpolymers and ethylene/propylene/octene terpolymers.

Disclosed herein as well are olefin polymers comprising monovinylidene aromatic monomers including styrene, o-methyl styrene, p-methyl styrene, t-butylstyrene, and the like. In particular, interpolymers comprising ethylene and styrene can be prepared. Optionally, copolymers comprising ethylene, styrene and a $C_3$-$C_{20}$ alpha olefin, optionally comprising a $C_4$-$C_{20}$ diene, having improved properties can be prepared.

Exemplary ethylene/α-olefin interpolymers may be or may not be substantially free of any diene monomers. Suitable diene monomers include conjugated and nonconjugated dienes. The nonconjugated diolefin can be a C6-C15 straight chain, branched chain or cyclic hydrocarbon diene. Illustrative nonconjugated dienes are straight chain acyclic dienes, such as 1,4-hexadiene, 1,5-heptadiene, 1,6-octadiene, 1,7-octadiene, 1,9-decadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene and mixed isomers of dihydromyrcene and dihydroocienene; single ring alicyclic dienes, such as 1,4-cyclohexadiene, 1,5-cyclooctadiene and 1,5-cyclododecadiene; multi-ring alicyclic fused and bridged ring dienes, such as tetrahydroindene, dicyclopentadiene, bicycle-(2,2,1)-hepta-2,5-diene, methyl tetrahydroindene; alkenyl, alkylidene, cycloalkenyl and cycloalkylidene norbornenes, such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, norbornadiene, methyl norbornadiene, vinyl norbornene, and 5-cyclohexylidene-2-norbornene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD). Preferred nonconjugated dienes include ENB, 1,4-hexadiene, 7-methyl-1,6-octadiene, and more preferably the diene is ENB. Suitable conjugated dienes include 1,3-pentadiene, 1,3-butadiene, 2-methyl-1,3-butadiene, 4-methyl-1,3-pentadiene, or 1,3-cyclopentadiene.

One class of desirable elastomers that can be made in accordance with embodiments of the invention are elastomers of ethylene, a $C_3$-$C_{20}$α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene containing polymers are generally referred to in the art as EP or EPDM polymers. Suitable dienes for use in preparing such polymers, especially EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

In certain embodiments, selectively hydrogenated block copolymers can be used as the toughening elastomer including block copolymers of conjugated dienes and vinyl aromatic hydrocarbons which exhibit elastomeric properties and which have 1,2-microstructure contents prior to hydrogenation of from about 7% to about 100%. Such block copolymers may be multiblock copolymers of varying structures containing various ratios of conjugated dienes to vinyl aromatic hydrocarbons including those containing up to about 60 percent by weight of vinyl aromatic hydrocarbon. Thus, multiblock copolymers may be utilized which are linear or radial, symmetric, or asymmetric and which have structures represented by the formulae, A-B, A-B-A, A-B-A-B, B-A, B-A-B, B-A-B-A, $(AB)_{0,1,2}$ ... BA and the like wherein A is a polymer block of a vinyl aromatic hydrocarbon or a conjugated diene/vinyl aromatic hydrocarbon tapered copolymer block and B is a polymer block of a conjugated diene.

In certain embodiments, the TPE component includes a styrenic block copolymer, such as a polystyrene-block-poly (ethylene-co-butylene)-block-polystyrene (SEBS) triblock thermoplastic elastomer. In general, styrenic block copolymers suitable for the invention include at least two monoalkenyl arene blocks, preferably two polystyrene blocks, separated by a block of saturated conjugated diene, preferably a saturated polybutadiene block. The preferred styrenic block copolymers have a linear structure, although in some embodiments, branched or radial polymers or functionalized block copolymers make useful compounds. The total number average molecular weight of the styrenic block copolymer is preferably from 30,000 to 250,000 if the copolymer has a linear structure. Such block copolymers typically have an average polystyrene content from 6 to 65, more typically from 10 to 40 wt % of the copolymer.

The block styrenic copolymers may be produced by any well known ionic block polymerization or copolymerization procedures including the well known sequential addition of monomer techniques, incremental addition of monomer techniques or coupling techniques as illustrated in, for example, U.S. Pat. Nos. 3,251,905, 3,390,207, 3,598,887, and 4,219,627, all of which are incorporated herein by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905, 3,265,765, 3,639,521, and 4,208,356, the disclosures of which are incorporated herein by reference.

The ethylene/α-olefin interpolymers of the present disclosure may be branched and/or unbranched interpolymers. The presence or absence of branching in the ethylene/α-olefin interpolymers, and if branching is present, the amount of branching, can vary widely, and may depend on the desired processing conditions and the desired polymer properties.

The nature of the ethylene/α-olefin (EAO) branching can vary to convenience. Preferably, the branching is long chain branching (LCB). The ability to incorporate LCB into polymer backbones has been known and practiced for many years. In U.S. Pat. No. 3,821,143, a 1,4-hexadiene was used as a branching monomer to prepare ethylene/propylene/diene (EPDM) polymers having LCB. Such branching agents are sometimes referred to as H branching agents. U.S. Pat. Nos. 6,300,451 and 6,372,847 also use various H type branching agents to prepare polymers having LCB. In U.S. Pat. No. 5,278,272, it was discovered that constrained geometry catalysts (CGC) have the ability to incorporate vinyl terminated macromonomers into the polymer backbone to form LCB polymers. Such branching is referred to as T type branching. Each of these patents (U.S. Pat. Nos. 3,821,143; 6,300,451; 6,372,847 and 5,278,272) is incorporated, herein, in its entirety, by reference.

The '272 patent teaches such CGC are unique in their ability to incorporate large unsaturated molecules into a polymer backbone. The amount of LCB that can be incorporated by these CGC is typically from 0.01 LCB/1000 carbon atoms to 3 LCB/1000 carbon atoms (both backbone and branched carbon atoms).

Preferably, the type of LCB in the interpolymers used in the practice of this invention is T-type branching, as opposed to H-type branching. T-type branching is typically obtained by copolymerization of ethylene or other alpha olefins with chain end unsaturated macromonomers in the presence of a constrained geometry catalyst under the appropriate reactor conditions, such as those described in WO 00/26268 (U.S. equivalent, U.S. Pat. No. 6,680,361, incorporated herein in its entirety by reference). If extremely high levels of LCB are desired, H-type branching is the preferred method, since T-type branching has a practical upper limit to the degree of LCB. As discussed in WO 00/26268, as the level of T-type branching increases, the efficiency or throughput of the manufacturing process decreases significantly, until the point is reached where production becomes economically unviable. The T-type LCB polymers can be produced by constrained geometry catalysts, without measurable gels, but with very high levels of T-type LCB. Because the macromonomer being incorporated into the growing polymer chain has only one reactive unsaturation site, the resulting polymer only contains side chains of varying lengths, and at different intervals along the polymer backbone.

H-type branching is typically obtained by copolymerization of ethylene or other alpha olefins with a diene having two double bonds reactive with a nonmetallocene type of catalyst in the polymerization process. As the name implies, the diene attaches one polymer molecule to another polymer molecule through a diene bridge; the resulting polymer molecule resembling an H that might be described as more of a crosslink than a long chain branch. H-type branching is typically used when extremely high levels of branching are desired. If too much diene is used, the polymer molecule can form so much branching or crosslinking that the polymer molecule is no longer soluble in the reaction solvent (in a solution process), and consequently falls out of solution, resulting in the formation of gel particles in the polymer. Additionally, use of H-type branching agents may deactivate metallocene catalysts, and reduce catalyst efficiency. Thus, when H-type branching agents are used, the catalysts used are typically not metallocene catalysts. The catalysts used to prepare the H-type branched polymers in U.S. Pat. No. 6,372,847 (incorporated herein in its entirety by reference) are vanadium type catalysts.

In another embodiment, the ethylene/α-olefin interpolymer is a homogeneously branched linear or homogeneously branched substantially linear ethylene/α-olefin interpolymer. Processes for preparing homogeneous polymers are disclosed in U.S. Pat. Nos. 5,206,075; 5,241,031; and PCT International Application WO 93/03093; each of which is incorporated, herein, by reference in its entirety. Further details regarding the production of homogeneous ethylene α-olefin copolymers are disclosed in U.S. Pat. Nos. 5,206,075; 5,241,031; PCT International Publication Number WO 93/03093; PCT International Publication Number WO 90/03414; all four of which are herein incorporated, herein, in their entireties, by reference.

The terms "homogeneous" and "homogeneously-branched" are used in reference to an ethylene/α-olefin polymer (or interpolymer), in which the comonomer(s) is randomly distributed within a given polymer molecule, and substantially all of the polymer molecules have the same ethylene-to-comonomer(s) ratio. The homogeneously branched ethylene interpolymers include linear ethylene interpolymers, and substantially linear ethylene interpolymers.

Included amongst the homogeneously branched linear ethylene interpolymers are ethylene interpolymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes, as described, for example, by Elston in U.S. Pat. No. 3,645,992. Commercial examples of homogeneously branched linear ethylene/α-olefin interpolymers include TAFMER™ polymers supplied by the Mitsui Chemical Company and EXACT™ polymers supplied by ExxonMobil Chemical Company.

Substantially linear ethylene interpolymers used in the present invention are described in U.S. Pat. Nos. 5,272,236 and 5,278,272; the entire contents of each are herein. As discussed above, the substantially linear ethylene interpolymers are those in which the comonomer is randomly distributed within a given interpolymer molecule, and in which substantially all of the interpolymer molecules have the same ethylene/comonomer ratio within that interpolymer. Substantially linear ethylene interpolymers are prepared using a constrained geometry catalyst. Examples of constrained geometry catalysts, and such preparations, are described in U.S. Pat. Nos. 5,272,236 and 5,278,272.

In addition, the substantially linear ethylene interpolymers are homogeneously branched ethylene polymers having long chain branching. The long chain branches have about the same comonomer distribution as the polymer backbone, and can have about the same length as the length of the polymer backbone. As discussed above, "substantially linear," typically, is in reference to a polymer that is substituted, on average, with 0.01 long chain branches per 1000 total carbons (including both backbone and branch carbons) to 3 long chain branches per 1000 total carbons.

Commercial examples of substantially linear polymers include ENGAGE™ polymers (The Dow Chemical Company), and AFFINITY™ polymers (The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous Ziegler-Natta catalyst polymerized linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

Exemplary linear ethylene copolymers or substantially linear ethylene copolymers include those disclosed in US 2009/0105404 A1, which is incorporated herein in its entirety.

Exemplary ethylene/α-olefin interpolymers include, but are not limited to, polybutadiene, poly(styrene-butadiene), poly(acrylonitrile diene) rubbers and saturated rubber, the diene rubber obtained by hydrogenating butadiene, isoprene rubber, chloroprene rubber, polybutylacrylate rubber, and ethylene/α-olefin copolymer rubber, where the α-olefin is an α-olefin having 3 to 20 carbon atoms, such as propylene, 1-butene, 1-pentene, 1-hexen, 4-methyl-1-pentene, 1-heptene, 1-octene, 1-nonene, 1-decen, 1-dodecene, and the like.

Suitable ethylene/α-olefin interpolymers include ENGAGE™, AFFINITY™, and NORDEL™ polymers available from The Dow Chemical Company, and VISTALON™ and EXACT™ polymers available from ExxonMobil Chemical Company, and TAFMER™ polymers available from Mitsui Chemical. Preferred ethylene interpolymers include ENGAGE™ and AFFINITY™ polymers available from The Dow Chemical Company, and VISTALON™, EXACT™ and EXCEED™ polymers available from ExxonMobil Chemical Company, and TAFMER™ polymers available from Mitsui Chemical.

In certain embodiments, the ethylene/α-olefin interpolymers have a molecular weight distribution (Mw/Mn) from 1 to 5, more preferably from 1.5 to 4 and most preferably from 2 to 3. All individual values and subranges from 1 to 5 are included herein and disclosed herein.

In certain embodiments, the ethylene/α-olefin interpolymers have a density greater than, or equal to 0.800 g/cc, preferably greater than, or equal to, 0.820 g/cc, and more preferably greater than, or equal to 0.830 g/cc in accordance with ASTM D792 or ISO 1183-187.

In certain embodiments, the ethylene/α-olefin interpolymers have a density less than, or equal to 0.900 g/cc, preferably less than, or equal to, 0.880 g/cc, and more preferably less than, or equal to, 0.870 g/cc in accordance with ASTM D792 or ISO 1183-187.

In certain embodiments, the ethylene/α-olefin interpolymers have a density from 0.800 to 0.900 g/cc, preferably from 0.820 to 0.880 g/cc, and more preferably from 0.830 to 0.870 g/cc in accordance with ASTM D792 or ISO 1183-187. All individual values and subranges from 0.800 to 0.900 g/cc are included herein and disclosed herein.

In certain embodiments, the ethylene/α-olefin interpolymers have an ethylene content of at least 50 weight percent.

In certain embodiments, the ethylene/α-olefin interpolymers have in accordance with ASTM D1238 or ISO 1133, a melt index, 12 (190° C./2.16 kg) greater than, or equal to, 0.05 g/10 min, preferably greater than, or equal to, 0.1 g/10 min, and more preferably greater than, or equal to 0.2 g/10 min.

In certain embodiments, the ethylene/α-olefin interpolymer have, in accordance with ASTM D1238 or ISO 1133, a melt index, 12 (190° C./2.16 kg), less than or equal to 50 g/10 min, less than or equal to 25 g/10 min, less than or equal to 10 g/10 min, less than or equal to 5 g/10 min, and/or less than or equal to 2 g/10 min.

In certain embodiments, the ethylene/α-olefin interpolymers have in accordance with ASTM D1238 or ISO 1133, a melt index, 12 (190° C./2.16 kg) from 0.05 to 50 g/10 min, from 0.1 to 25 g/10 min, and/or from 0.2 to 10 g/10 min. All individual values and subranges from 0.05 to 50 g/10 min are included herein and disclosed herein.

In certain embodiments, the ethylene/α-olefin interpolymers have a number average molecular weight, (Mn) from 40,000 g/mole to 200,000 g/mole, more preferably from 50,000 g/mole to 150,000 g/mole, and most preferably from 60,000 g/mole to 100,000 g/mole. All individual values and subranges from 40,000 g/mole to 200,000 g/mole are included herein and disclosed herein.

In certain embodiments, the ethylene/α-olefin interpolymers have a weight average molecular weight, (Mw) from 80,000 g/mole to 400,000 g/mole, more preferably from 100,000 g/mole to 300,000 g/mole, and most preferably from 120,000 g/mole to 200,000 g/mole. All individual values and subranges from 80,000 g/mole to 400,000 g/mole are included herein and disclosed herein.

In certain embodiments, the ethylene/α-olefin interpolymers have a Tg less than −30° C., preferably less than −40° C., and more preferably less than −50° C.

An ethylene/α-olefin interpolymer may have a combination of two or more embodiments as described herein.

The ethylene/α-olefin interpolymers of the present disclosure may be produced by any process or means known by one of ordinary skill in the art.

In certain embodiments, the TPE component may comprise more than one ethylene/α-olefin block interpolymer or ethylene/α-olefin multi block interpolymer as described herein.

In certain embodiments, the thermoplastic polyolefin elastomer component includes an ethylene/α-olefin multi block interpolymer, as described below.

Olefin Block Copolymer

In certain embodiments, the at least one thermoplastic polyolefin elastomer is an olefin block copolymer. The term "olefin block copolymer" or "OBC" means (and is interchangeable with) an "ethylene/α-olefin multi-block interpolymer" and includes ethylene and one or more copolymerizable α-olefin comonomer in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the interpolymer, it is understood that this means polymerized units thereof. In some embodiments, the ethylene/α-olefin interpolymer is an ethylene/α-olefin multi-block interpolymer. In some embodiments, the ethylene/α-olefin multi-block copolymer can be represented by the following formula: $(AB)_n$, where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows. AAA-AA-BBB-BB.

In certain embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms, or 4 or more carbon atoms. In some embodiments, the ethylene/α-olefin multi-block copolymer may comprise 50 mol % to 90 mol % ethylene, or 60 mol % to 85 mol % ethylene, or 65 mol % to 80 mol % ethylene. For many ethylene/octene multi-block copolymers, the composition comprises an ethylene content greater than 80 mole percent of the whole polymer and an octene content of from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Interpolymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In an embodiment, the ethylene multi-block copolymer is defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2,$$

and/or (B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYS- TAF") peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d);$$

and/or (D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn, greater than about 1.3.

It is understood that the ethylene/α-olefin multi-block interpolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

The ethylene/α-olefin multi-block interpolymer, and further copolymer, may comprise any one of properties (A) through (G), or may comprises a combination of two or more of (A) through (G).

Another type of ethylene/α-olefin multi-block interpolymers that may be used are those referred to as "mesophase separated". The term "mesophase separation" means a process in which polymeric blocks are locally segregated to form ordered domains. Crystallization of the ethylene segments in these systems is primarily constrained to the resulting mesodomains and such systems may be referred to as "mesophase separated". These mesodomains can take the form of spheres, cylinders, lamellae, or other morphologies known for block copolymers. The narrowest dimension of a domain, such as perpendicular to the plane of lamellae, is generally greater than about 40 nm in the mesophase separated block copolymers of the instant invention. In some embodiments, the olefin block copolymer is mesophase separated. Examples of these interpolymers may be found in, for example, International Publication Nos. WO/2009/097560, WO/2009/097565, WO/2009/097525, WO/2009/097529, WO/2009/097532, and WO/2009/097535, all of which are herein incorporated by reference.

With respect to the mesophase separated olefin block copolymers, in some embodiments, the delta comonomer is greater than 18.5 mol %, greater than 20 mol % or greater than 30 mol %. The delta comonomer can be from 18.5 mol % to 70 mol %, from 20 mol % to 60 mol % or from 30 mol % to 50 mol %. The term 'delta comonomer' means the difference in mole percent comonomer between the hard segment and the soft segment of the olefin block copolymer. The delta comonomer can be measured using $^{13}$C NMR such as described below and in U.S. Pat. No. 7,947,793. In certain embodiments, the ethylene/α-olefin multi-block interpolymer has a soft segment composed of from 20 mol % to 50 mol % derived from the comonomer (e.g., octene).

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydro-naphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

The olefin block copolymers can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793. Further exemplary catalytic processes include those disclosed in U.S. Pat. No. 8,785,554, which is herein incorporated by reference.

In certain embodiments, the ethylene/α-olefin multi-block interpolymer has a density greater than 0.850 g/cc, further greater than 0.860 g/cc, and further greater than 0.865 g/cc. The density may be, for example, from 0.850 g/cc to 0.950 g/cc, from 0.860 g/cc to 0.925 g/cc, and from 0.860 to 0.900 g/cc. Density is measured by the procedure of ASTM D-792 or ISO 1183.

In certain embodiments, the ethylene/α-olefin multi-block interpolymer, and further copolymer, has a melting point of greater than 90° C., further greater than 100° C. The melting point is measured by Differential Scanning calorimetry (DSC) method described in U.S. Publication 2006/0199930 (WO 2005/090427), incorporated herein by reference.

In certain embodiments, the ethylene/α-olefin multi-block interpolymer, and further copolymer, has a melt index (I2) greater than, or equal to, 0.1 g/10 min, and further greater than, or equal to, 0.5 g/10 min, as determined using ASTM D-1238 or ISO 1133 (190° C., 2.16 kg load).

In certain embodiments, the ethylene/α-olefin multi-block interpolymer, and further copolymer, has a melt index (I2) less than, or equal to, 50 g/10 min, further less than, or equal to, 20 g/10 min, and further less than, or equal to, 10 g/10 min, as determined using ASTM D-1238 or ISO 1133 (190° C., 2.16 kg load).

Compatibilization Agent

The composition may include from 0.1 wt % to 15 wt % (e.g., from 0.5 wt % to 10 wt %, from 1 wt % to 10 wt %, and/or from 5 wt % to 10 wt %) of a compatibilization agent. In certain embodiments of the present disclosure, the chopped carbon fibers described above are chemically bonded into the polypropylene matrix through use of a compatibilization agent to enable excellent mechanical properties. In certain embodiments, the composition of the present disclosure may be modified by, for example, grafting, hydrogenation, nitrene insertion reactions, or other functionalization reactions using compatibilization agents such as those known to those skilled in the art.

A variety of radically graftable species as compatibilization agents may be used, either individually, or as relatively short grafts. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds. These species also include silane compounds.

Radically graftable species of the silane class of materials may be attached to the polymer, either individually, or as relatively short grafts. These species include, but are not limited to, vinylalkoxysilanes, vinyltrimethoxysilane, vinyltriethoxysilane, vinyltriacetoxysilane, vinyltrichlorosilane, and the like. Generally, materials of this class include, but are not limited to, hydrolyzable groups, such as alkoxy, acyloxy, or halide groups, attached to silicon. Materials of this class also include non-hydrolyzable groups, such as alkyl and siloxy groups, attached to silicon.

Other radically graftable species may be attached to the polymer, individually, or as short-to-longer grafts. These species include, but are not limited to, methacrylic acid; acrylic acid; Diels-Alder adducts of acrylic acid; methacrylates including methyl, ethyl, butyl, isobutyl, ethylhexyl, lauryl, stearyl, hydroxyethyl, and dimethylaminoethyl; acrylates including methyl, ethyl, butyl, isobutyl, ethylhexyl, lauryl, stearyl, and hydroxyethyl; glycidyl methacrylate; trialkoxysilane methacrylates, such as 3-(methacryloxy)propyltrimethoxysilane and 3-(methacryloxy)propyl-triethoxysilane, methacryloxymethyltrimethoxysilane, methacryloxymethyltriethoxysilane; acrylonitrile; 2-isopropenyl-2-oxazoline; styrene; α-methylstyrene; vinyltoluene; dichlorostyrene; N-vinylpyrrolidinone, vinyl acetate, methacryloxypropyltrialkoxysilanes, methacryloxymethyltrialkoxysilanes and vinyl chloride.

In exemplary embodiments, the compatibilization agents used in the composition have glycidyl or acrylic functionality. In exemplary embodiments, the compatibilization agents used include maleic acid-modified or copolymerized polyolefins made to coexist with fumaric acid-modified or copolymerized polyolefins; acrylic-modified or copolymerized polyolefins that are made to coexist with fumaric acid-modified or copolymerized polyolefins; and/or silane grafted polyolefins.

In exemplary embodiments, the compatibilization agent used in the composition is a maleic anhydride (MAH) functionalized polyolefin. In exemplary embodiments, the compatibilization agent is a maleic anhydride functionalized polyolefin where the percentage of grafted MAH is from 0.1% to 2.5% (e.g., from 0.2% to 2%, from 0.3% to 1.5%, and/or from 0.5% to 1%).

Composition

The compositions of the present disclosure may be useful for preparing articles using known processes. For example, the compositions may be fabricated into parts, sheets or other article of manufacture, using any extrusion, calendering, blow molding, compression molding, injection molding, or thermoforming processes. The components of the composition may be fed to the process either pre-mixed, or the components may be fed directly into the process equipment, such as a converting extruder, such that the composition is formed therewithin. The compositions may be blended with another polymer, prior to fabrication of an article. Such blending may occur by any of a variety of conventional techniques, one of which is dry blending of pellets of the compositions with pellets of another polymer.

The compositions of the present disclosure can optionally include one or more additives and/or fillers. Non-limiting examples of additives and/or fillers include plasticizers, thermal stabilizers, light stabilizers (e.g., UV light stabilizers and absorbers), antioxidants, slip agents, process aids, optical brighteners, antistats, lubricants, catalysts, rheology modifiers, biocides, corrosion inhibitors, dehydrators, organic solvents, colorants (e.g., pigments and dyes), surfactants, demolding additives, mineral oil, antiblocking agents, nucleating agents, flame retardants, reinforcing fillers (e.g., glass, fibers, anti-scratch additives, talc, calcium carbonate, mica, glass fibers, whisker, etc.), processing aids, metal fibers, boron fibers, ceramic fibers, polymeric fibers, kaolin, glass, ceramic, carbon/polymeric microspheres, silica, mica, carbon fibers, clay, hemp fibers, and combinations thereof.

In exemplary embodiments, the composition has a melt flow rate of at least 10 g/10 minutes in accordance with ISO 1133 at 230° C., 2.16 kg.

In certain embodiments, the composition of the present disclosure comprises a flexural modulus (ISO 178) from 2000 MPa to 7100 MPa (e.g., from 2500 MPa to 7100 MPa, from 3000 MPa to 7100 MPa, from 4000 MPa to 7100 MPa, and/or from 5000 MPa to 7100 MPa). In certain embodiments, the composition of the present disclosure comprises a flexural modulus (ISO 178) of greater than 2000 MPa, greater than 3000 MPa, greater than 4000 MPa, greater than 5000 MPa, greater than 6000 MPa, greater than 7000 MPa, or greater than 7050 MPa.

In certain embodiments, the composition of the present disclosure comprises a Charpy impact strength (ISO 179-1) from 5 kJ/m$^2$ to 20 kJ/m$^2$. In certain embodiments, the composition of the present disclosure comprises a Charpy impact strength (ISO 179-1) of greater than 5 kJ/m$^2$, greater than 6 kJ/m$^2$, greater than 7 kJ/m$^2$, greater than 8 kJ/m$^2$, greater than 9 kJ/m$^2$, greater than 10 kJ/m$^2$, greater than 11 kJ/m$^2$, greater than 12 kJ/m$^2$, greater than 13 kJ/m$^2$, or greater than 16 kJ/m$^2$.

In certain embodiments, the composition of the present disclosure comprises a falling dart maximum force energy (ISO 6603-2 (2000 edition)) from 4 J to 20 J. In certain embodiments, the composition of the present disclosure comprises a falling dart maximum force energy (ISO 6603-2 (2000 edition)) of greater than 4 J, greater than 5 J, greater than 7 J, greater than 10 J, or greater than 15 J.

In certain embodiments, the composition of the present disclosure comprises a yield stress (ISO 178) from 20 MPa to 60 MPa (e.g., from 25 MPa to 57 MPa, from 25 MPa to 55 MPa, from 25 MPa to 50 MPa, etc.).

In certain embodiments, the composition of the present disclosure comprises a yield strain (ISO 178) from 0.5% to 10%.

In certain embodiments, the composition of the present disclosure comprises a stress at break (ISO 178) from 5 MPa to 60 MPa (e.g., from 5 MPa to 56 MPa, from 10 MPa to 55 MPa, from 15 MPa to 55 MPa, from 20 MPa to 50 MPa, etc.).

In certain embodiments, the composition of the present disclosure comprises a strain at break (ISO 178) from 1 MPa to 40 MPa (e.g., from 1 MPa to 37 MPa, from 1 MPa to 35 MPa, from 1 MPa to 30 MPa, from 1 MPa to 20 MPa, from 1 MPa to 15 MPa, from 1 MPa to 10 MPa, etc.).

In certain embodiments, the composition of the present disclosure comprises an average CLTE value of less than 5E−05 m/m/° C. via machine direction (e.g., less than 4E−05 m/m/° C., less than 3.5E−05 m/m/° C., less than 3E−05 m/m/° C., less than 2.5E−05 m/m/° C., etc.).

In certain embodiments, the composition of the present disclosure comprises an average CLTE value of less than 8E−05 m/m/° C. via transverse direction (e.g., less than 7.5E−05 m/m/° C., less than 7E−05 m/m/° C., less than 6.5E−05 m/m/° C., less than 6E−05 m/m/° C., less than 5.5E−05 m/m/° C., less than 5E−05 m/m/° C., less than 4.5E−05 m/m/° C., less than 4E−05 m/m/° C., less than 3.75E−05 m/m/° C., etc.).

Compositions of the present disclosure may have one, some, or all of the above-described properties regarding flexural modulus, Charpy impact strength, falling dart maximum force energy, yield stress, yield strain, stress at break, strain at break, and CLTE values.

Examples

Density is measured in accordance with ASTM D792 or ISO 1183. The results are reported in grams (g) per cubic centimeter, or g/cc.

Melt flow index is measured in accordance with ASTM D1238 or ISO 1133 at 190° C., 2.16 kg. The results are reported in grams/10 minutes.

Melt flow rate is measured in accordance with ASTM D1238 or ISO 1133 at 230° C., 2.16 kg. The results are reported in grams/10 minutes.

Charpy Impact Test: Impact performance is measured using a Pendulum Impact Tester Zwick 5102. Samples are first cut into appropriate samples, notched, and cooled for 24 hours (for temperatures lower than 23° C.). The tests are performed according to ISO 179-1 standard.

Flexural Modulus: Flexural modulus is determined using a Zwick Z010 and performed according to ISO 178 standard.

Falling Dart: Falling weight impact properties are determined using a Ceast Fractovis 6789/000 and measured according to ISO 6603-2 (2000 edition).

Tensile Properties: Tensile properties, including yield stress, yield strain, stress at break, and strain at break are measured in accordance with ISO 178.

Coefficient of Linear Thermal Expansion (CLTE): CLTE is determined with a TMA3920 thermomechanical analyzer (TA Instruments) in compression mode at 4° C./minute and a load of 0.039 N. The samples are annealed at 100° C. for 24 hours to remove the thermal and stress history.

Molecular weight distribution (MWD) is measured using Gel Permeation Chromatography (GPC). In particular, conventional GPC measurements are used to determine the weight-average (Mw) and number-average (Mn) molecular weight of the polymer and to determine the MWD (which is calculated as Mw/Mn). Samples are analyzed with a high-temperature GPC instrument. The method employs the well-known universal calibration method, based on the concept of hydrodynamic volume, and the calibration is performed using narrow polystyrene (PS) standards. The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, 621 (1968)) to derive the following equation:

$$M_{polyethylene} = a*(M_{polystyrene})^b.$$

In this equation, a=0.4316 and b=1.0 (as described in Williams and Ward, J. Polym. Sc., Polym. Let., 6, 621 (1968)). Polyethylene equivalent molecular weight calculations were performed using VISCOTEK TriSEC software Version 3.0.

Gel permeation chromatographic (GPC) system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)):

$$M_{polypropylene} = 0.645(M_{polystyrene}).$$

Differential Scanning calorimetry (DSC) results are determined using a TAI model Q1000 DSC equipped with an RCS cooling accessory and an autosampler. A nitrogen purge gas flow of 50 ml/min is used. The sample is pressed into a thin film and melted in the press at about 190° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −90° C. at 10° C./min cooling rate and held at −90° C. for 3 minutes. The sample is then heated to 180° C. at 10° C./min heating rate. The cooling (Tc) and second heating curves (Tm) are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline. DSC can also be used to measure the soft segment melting temperature, as discussed in WO 2006/101966 A1, which is incorporated herein by reference in its entirety.

$^{13}$C NMR spectroscopy is one of a number of techniques known in the art for measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)), which is incorporated by reference herein in its entirety. The basic procedure for determining the comonomer content of an ethylene/olefin interpolymer involves obtaining a $^{13}$C NMR spectrum under conditions where the intensity of the peaks corresponding to the different carbons in a sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomers. The mole % comonomer can be determined by the ratio of the integrals corresponding to the number of moles of comonomer to the integrals corresponding to the number of moles of all of the monomers in the interpolymer, as described in the aforementioned Randall reference.

The soft segment weight percentage and hard segment weight percentage of and ethylene/olefin interpolymer of the present disclosure is determined by DSC, and mole % comonomer in the soft segment of an ethylene/olefin interpolymer of the present disclosure is determined by $^{13}$C NMR spectroscopy and the methods described in WO 2006/101966 A1, which is incorporated herein by reference in its entirety.

$^{13}$C NMR Analysis: The samples are prepared by adding approximately 2.7 g of a 50/50 mixture of tetrachloroethane-$d_2$/orthodichlorobenzene to 0.2 g sample in a 10 mm NMR tube. The samples are dissolved and homogenized by heating the tube and its contents to 150° C. The data are collected using a JEOL Eclipse™ 400 MHz spectrometer, Bruker 400 MHz spectrometer, or a Varian Unity Plus™ 400 MHz spectrometer, corresponding to a $^{13}$C resonance frequency of 100.5 MHz. The data is acquired using 256 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 120° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

DEZ levels (ppm) may be measured by standard industry procedure, such as mass balance or an XRF method.

Standard CRYSTAF Method: Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Melt temperature, or "Tm" as used herein (also referred to as a melting peak in reference to the shape of the plotted DSC curve), is typically measured by the DSC (Differential Scanning calorimetry) technique for measuring the melting points or peaks of polyolefins as described in U.S. Pat. No. 5,783,638, wherein the Tm is the second heat melt temperature taken at a ramp rate of 10° C./min and Tm is largest peak. The heat of fusion (Hf) (measured in Joules/gram, J/g) and the peak melting temperature are reported from the second heat curve. Peak crystallization temperature is determined from the cooling curve. Crystallization temperature, Tc, is determined from the DSC cooling curve as above except the tangent line is drawn on the high temperature side of the crystallization peak. Where this tangent intersects the baseline is the extrapolated onset of crystallization (Tc). It should be noted that many blends comprising two or more polyolefins will have more than one melting point or peak, and many individual polyolefins will comprise only one melting point or peak.

The following materials are principally used in the examples of the present disclosure:

PP: A polypropylene homopolymer having properties including a density of 0.900 g/cc (ISO 1183), a melt flow rate of 50.0 g/10 minutes (ISO 1133 at 230° C., 2.16 kg), and a flexural modulus of 1800 MPa (ISO 178) (available as H734-52RNA Polypropylene from Braskem).

OBC: An olefin block copolymer having properties including a density of 0.870 g/cc (ASTM D792), a melt flow index of 0.5 g/10 minutes (ASTM D1238 at 190° C., 2.16 kg), and a flexural modulus of 6.6 MPa (ASTM D790) (available as ENGAGE™ XLT 8677 from The Dow Chemical Company).

POE1: An ethylene-octene copolymer having properties including a density of 0.857 g/cc (ASTM D792), a melt flow index of 1.0 g/10 minutes (ASTM D1238 at 190° C., 2.16 kg), and a flexural modulus of 4.0 MPa (ASTM D790) (available as ENGAGE™ 8842 from The Dow Chemical Company).

POE2: An ethylene-octene copolymer having properties including a density of 0.868 g/cc (ASTM D792), a melt flow index of 0.5 g/10 minutes (ASTM D1238 at 190° C., 2.16 kg), and a flexural modulus of 14.4 MPa (ASTM D790) (available as ENGAGE™ 8150 from The Dow Chemical Company).

POE3: An ethylene-butene copolymer having properties including a density of 0.862 g/cc (ASTM D792), a melt flow index of 1.2 g/10 minutes (ASTM D1238 at 190° C., 2.16 kg), and a flexural modulus of 4.0 MPa (ASTM D790) (available as ENGAGE™ 7467 from The Dow Chemical Company).

POE4: An ethylene-propylene copolymer having properties including a density of 0.863 g/cc (ASTM D792), a melt flow index of 8 g/10 minutes (ASTM D1238 at 190° C., 2.16 kg), and a flexural modulus of 13.8 MPa (ASTM D790) (available as VERSIFY™ 3401 from The Dow Chemical Company).

MAH-g-PP: A maleic anhydride (MAH) grafted polypropylene 0 with 0.8 wt % MAH having properties including a density of about 0.900 g/cc (ASTM D792), a melt flow rate of 300-700 g/10 minutes (ASTM D1238 at 230° C., 2.16 kg), and a flexural modulus of 1750 MPa (ASTM D790) (available as MORTON™ 899P from The Dow Chemical Company).

AC1101: Chopped carbon fibers (length of 6 mm) sized with an epoxy- and phenoxy-based emulsion with properties including a density of 1.76 g/cc (ISO 10119) and a tensile modulus of 240 GPa (ISO 10618) (available as AC1101 from DowAska).

CS 7952 (28/779): Chopped strands of glass fiber with an average fiber length of 4.5 mm and a fiber diameter of 14 μm (available as CS 7952 (28/779) from Lanxess Corporation).

Based on these materials, formulations are prepared for the inventive and comparative examples of the present disclosure as seen in Tables 1 and 2. All formulations in Tables 1 and 2 are compounded on a Buss Compounder MDK/E 46 with a single mixing screw (46 mm L/D). The compounds are then injection molded as dog bones using an Injection Molding Boy 55E (BOY Machines, Inc.) for mechanical property testing. The mechanical property test results are also provided in Tables 1 and 2.

TABLE 1

| Materials | | Ex. A | Ex. B | Ex. 1 | Ex. 2 | Ex. 3 | Ex. 4 | Ex. 5 |
|---|---|---|---|---|---|---|---|---|
| Formulation (wt %) | | | | | | | | |
| AC1101 | | — | 20 | 20 | 20 | 20 | 20 | 20 |
| CS 7952 (28/779) | | — | — | — | — | — | — | — |
| PP | | 100 | 80 | 60 | 60 | 60 | 60 | 60 |
| POE1 | | — | — | 20 | — | — | — | — |
| POE2 | | — | — | — | 20 | — | — | — |
| POE3 | | — | — | — | — | 20 | — | — |
| POE4 | | — | — | — | — | — | 20 | — |
| OBC | | — | — | — | — | — | — | 20 |
| MAH-g-PP | | — | — | — | — | — | — | — |
| Mechanical Properties at 23° C. | | | | | | | | |
| Flexural Modulus | MPa | 1940 ± 20 | 6063 ± 56 | 5918 ± 57 | 6083 ± 23 | 5852 ± 158 | 5681 ± 74 | 5483 ± 131 |
| Charpy Impact Strength | kJ/m2 | 2.18 ± 0.08 | 2.86 ± 0.11 | 7.08 ± 0.15 | 6.95 ± 0.41 | 6.67 ± 0.13 | 6.26 ± 0.23 | 9.84 ± 0.55 |
| Falling dart maximum force energy | J | 1.09 ± 0.49 | 2.39 ± 0.49 | — | 7.28 ± 0.62 | — | — | 14.01 ± 1.58 |
| Yield Stress | MPa | 38.51 ± 0.44 | 36.74 ± 0.13 | 27.83 ± 0.19 | 27.32 ± 0.14 | 26.72 ± 0.11 | 26.61 ± 0.23 | 25.28 ± 0.06 |
| Yield Strain | % | 6.96 ± 0.17 | 2.88 ± 0.10 | 0.80 ± 0.02 | 0.91 ± 0.07 | 0.78 ± 0.03 | 0.70 ± 0.02 | 1.09 ± 0.14 |
| Stress at break | MPa | 33.63 ± 2.38 | 34.28 ± 0.28 | 10.32 ± 3.97 | 10.46 ± 4.01 | 12.45 ± 4.78 | 17.28 ± 2.79 | 5.88 ± 0.80 |
| Strain at break | MPa | 12 ± 3 | 4 ± 0 | 2 ± 1 | 2 ± 0 | 2 ± 1 | 8 ± 2 | 3 ± 0 |

TABLE 2

| Materials | | Ex. 6 | Ex. 7 | Ex. 8 | Ex. 9 | Ex. 10 | Ex. C | Ex. D |
|---|---|---|---|---|---|---|---|---|
| Formulation (wt %) | | | | | | | | |
| AC1101 | | 20 | 20 | 5 | 10 | 30 | — | — |
| CS 7952 (28/779) | | — | — | — | — | — | 30 | 30 |
| PP | | 52 | 52 | 61.7 | 58.5 | 45.5 | 70 | 50 |
| POE1 | | — | — | — | — | — | — | — |
| POE2 | | 20 | — | — | — | — | — | — |
| POE3 | | — | — | — | — | — | — | — |
| POE4 | | — | — | — | — | — | — | — |
| OBC | | — | 20 | 23.8 | 22.5 | 17.5 | — | 20 |
| MAH-g-PP | | 8 | 8 | 9.5 | 9 | 7 | — | — |
| Mechanical Properties at 23° C. | | | | | | | | |
| Flexural Modulus | MPa | 5603 ± 30 | 5329 ± 22 | 2075 ± 28 | 3297 ± 63 | 7065 ± 34 | 4090 ± 45 | 3308 ± 17 |
| Charpy Impact Strength | kJ/m2 | 10.27 ± 0.21 | 13.34 ± 0.61 | 9.08 ± 0.52 | 11.10 ± 0.94 | 17.04 ± 0.35 | 2.61 ± 0.15 | 7.28 ± 0.21 |
| Falling dart maximum force energy | J | — | 4.42 ± 0.13 | — | — | 8.30 ± 0.84 | 1.98 ± 0.51 | 6.82 ± 0.77 |
| Yield Stress | MPa | 0.24 ± 0.52 | 45.17 ± 0.18 | 26.36 ± 0.33 | 32.97 ± 0.21 | 56.91 ± 0.44 | 33.12 ± 0.21 | 24.76 ± 0.27 |
| Yield Strain | % | 6.01 ± 0.16 | 6.27 ± 0.35 | 5.75 ± 0.22 | 6.03 ± 0.27 | 4.59 ± 0.16 | 2.62 ± 0.05 | 2.54 ± 0.11 |
| Stress at break | MPa | 48.93 ± 0.43 | 42.90 ± 0.61 | 15.75 ± 1.06 | 29.67 ± 0.38 | 55.14 ± 0.60 | 31.30 ± 0.81 | 19.94 ± 1.02 |
| Strain at break | MPa | 8 ± 1 | 9 ± 1 | 30 ± 7 | 12 ± 1 | 6 ± 1 | 4 ± 1 | 5 ± 1 |

As seen when comparing Example A with Example B, the addition of carbon fibers to a polypropylene matrix allows for a high increase in flexural modulus but does not significantly improve the impact resistance properties (Charpy impact strength and falling dart impact energy) or the tensile properties (yield stress, stress at break, and strain at break). By contrast, as seen in Inventive Examples 1-5, the addition of a thermoplastic polyolefin elastomer (TPE) to a polypropylene matrix containing carbon fibers surprisingly and unexpectedly allows for an increase in impact resistance properties (Charpy impact strength and falling dart impact energy) while limiting the decrease in flexural modulus. As seen in Inventive Example 5, a particularly significant increase in impact resistance is unexpectedly demonstrated when the thermoplastic polyolefin elastomer added to the polypropylene matrix containing carbon fibers is an olefin block copolymer. These results are surprising and unexpected, since one of ordinary skill in the art would assume that the addition of carbon fibers to a composition would negatively impact the stiffness and toughness of the composition due to the fact that carbon fibers are very brittle and break down to small fibers after being compounded or injection molded into parts.

Furthermore, as seen in Inventive Examples 6-10, the addition of a compatibilization agent to the polypropylene/carbon fiber composite containing a TPE unexpectedly and surprisingly allows for further improvement of the Charpy impact strength, as well as improvements in terms of tensile properties (e.g., yield stress, stress at break, and strain at break). As seen in Inventive Example 10, increasing the concentration of carbon fibers to 30 weight percent in the presence of a compatibilization agent allows the increase of the Charpy impact strength and the flexural modulus, as well as certain tensile properties. Without the compatibilization agent, the Charpy impact strength decreases with higher concentration of carbon fibers due to the limited compatibility between carbon fibers and the polypropylene matrix.

The current state of the art of the automotive industry incorporates the use of glass fibers. In this regard, with respect to Comparative Examples C and D, it can observed that the use of carbon fibers in the present invention surprisingly showed better results in terms of both the impact resistance and the flexural modulus compared to use of glass fibers.

Accordingly, the present application discloses that the addition of a TPE surprisingly and unexpectedly allows for a significant increase of impact resistance of polypropylene/carbon fiber composites, while maintaining a high stiffness. Moreover, the addition of a compatibilization agent, such as polypropylene grafted with maleic anhydride, enhances the increase of Charpy impact strength, especially with a higher concentration of carbon fibers, and also enhances the tensile properties, such as yield stress, stress at break, and strain at break.

Further to the mechanical property testing, Coefficient of Linear Thermal Expansion (CLTE) tests were also performed according to the formulations of Tables 3 and 4. All formulations in Tables 3 and 4 are compounded on a Buss Compounder MDK/E 46 with a single mixing screw (46 mm L/D). The compounds are then injection molded as dog bones using an Injection Molding Boy 55E (BOY Machines, Inc.) for CLTE testing. The CLTE test results are also provided in Tables 3 and 4. MD refers to machine direction. TD refers to transverse direction.

TABLE 3

| Materials | | Ex.B | | Ex. E | | Ex. 11 | | Ex. 12 | |
|---|---|---|---|---|---|---|---|---|---|
| Formulation (wt%) | | | | | | | | | |
| AC1101 | | 20 | | — | | 30 | | 20 | |
| CS 7952 (28/779) | | — | | — | | — | | — | |
| PP | | 80 | | 80 | | 50 | | 60 | |
| OBC | | — | | 20 | | 20 | | 20 | |
| CLTE Results | | | | | | | | | |
| Direction | | MD | TD | MD | TD | MD | TD | MD | TD |
| Actual | N = 1 | 0.7359 | 1.228 | 1.500 | 1.693 | 0.2603 | 0.3561 | 0.4013 | 0.7716 |
| dimensional | N = 2 | 0.9155 | 1.072 | 1.537 | 1.613 | 0.3475 | 0.5909 | 0.4189 | 0.7539 |
| change (%) (−40 to −100° C.) | N = 3 | 0.5574 | 1.13 | 1.509 | 1.546 | 0.2773 | 0.6206 | 0.4711 | 1.075 |
| CL1E (−40 | N = 1 | 5.26E−05 | 8.77E−05 | 1.07E−04 | 1.21E−04 | 1.86E−05 | 2.54E−05 | 2.87E−05 | 5.51E−05 |
| to −100° C.) | N = 2 | 6.54E−05 | 7.66E−05 | 1.10E−04 | 1.15E−04 | 2.48E−05 | 4.22E−05 | 2.99E−05 | 5.39E−05 |
| | N = 3 | 3.98E−05 | 8.07E−05 | 1.08E−04 | 1.10E−04 | 1.98E−05 | 4.43E−05 | 3.37E−05 | 7.68E−05 |
| Average CLTE (m/m/° C.) | MPa | 5.25905E−05 | 8.16667E−05 | 0.000108238 | 0.000115524 | 2.10738E−05 | 3.73238E−05 | 3.07452E−05 | 6.19167E−05 |
| STDEV (m/m/° C.) | % | 1.27893E−05 | 5.63215E−06 | 1.37828E−06 | 5.25684E−06 | 3.30183E−06 | 1.03499E−05 | 2.59294E−06 | 1.28925E−05 |

TABLE 4

| Materials | | Ex. F | | Ex. G | |
|---|---|---|---|---|---|
| Formulation (wt %) | | | | | |
| AC1101 | | 70 | | 50 | |
| CS 7952 (28/779) | | 30 | | 30 | |
| PP | | — | | — | |
| OBC | | — | | 20 | |
| CLTE Results | | | | | |
| Direction | | MD | TD | MD | TD |
| Actual dimensional | N = 1 | 0.9118 | 1.228 | 0.7925 | 1.067 |
| change (%) | N = 2 | 0.8767 | 1.089 | 0.6642 | 1.613 |
| (−40 to −100° C.) | N = 3 | 0.6902 | 0.8485 | 0.615 | 1.404 |
| CLTE | N = 1 | 6.51E−05 | 8.77E−05 | 5.66E−05 | 7.62E−05 |
| (−40 to −100° C.) | N = 2 | 6.26E−05 | 7.78E−05 | 4.74E−05 | 1.15E−04 |
| | N = 3 | 4.93E−05 | 6.06E−05 | 4.39E−05 | 1.00E−04 |
| Average CLTE (m/m/° C.) | MPa | 5.90167E−05 | 7.5369E−05 | 4.93262E−05 | 9.72381E−05 |
| STDEV (m/m/° C.) | % | 8.50774E−06 | 1.37142E−05 | 6.54574E−06 | 1.96778E−05 |

A decrease of CLTE of polypropylene-based compounds is seen when carbon fibers are added, as seen when comparing Comparative Example B with Comparative Example E. A decrease in CLTE value is also seen when carbon fibers are used relative to use of glass fibers, as seen when comparing Comparative Example B with Comparative Example F and when comparing Inventive Example 12 with Comparative Example G.

Beyond this, Inventive Examples 11 and 12 (when compared to Comparative Examples B, E, F, and G) surprisingly and unexpectedly exhibit a significant decrease in CLTE value when an olefin block copolymer and carbon fibers are added to a polypropylene matrix. Accordingly, the present application discloses an unexpected synergetic effect of carbon fibers with olefin block copolymer in a polypropylene-based compound to achieve very low CLTE values.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A composition comprising:
   (A) from 30 wt % to 94 wt % of a propylene component including at least one propylene-based polymer having a propylene content of at least 75 wt %, based on the total weight of the propylene-based polymer, and a melt flow rate from 20 to 75 g/10 minutes as measured by ISO 1133 at 230° C./2.16 kg;
   (B) from 1 wt % to 50 wt % of a carbon fiber component;
   (C) from 5 wt % to 69 wt % of a thermoplastic polyolefin elastomer with a density from 0.850 g/cc to 0.875 g/cc as measured by ASTM D792, and a melt flow index from 0.1 g/10 minutes to 50 g/10 minutes as measured by ASTM D1238 at 190° C./2.16 kg; and
   (D) from 0.1 wt % to 15 wt % of a maleic-anhydride grafted polypropylene compatibilization agent that has a graft amount of maleic anhydride from 0.5 to 1.0 wt % and a melt flow rate from 300 to 700 g/10 min measured by ASTM D1238 at 230° C., 2.16 kg; wherein the composition comprises an average CLTE value of less than 5E−05 m/m/° C. via machine direction, and an average CLTE value of less than 8E−05 m/m/° C. via transverse direction.

2. The composition of claim 1, wherein the carbon fiber component comprises chopped carbon fibers sized with an epoxy- and phenoxy-based emulsion.

3. The composition of claim 1, wherein the thermoplastic polyolefin elastomer is an ethylene/alpha-olefin interpolymer.

4. The composition of claim 1, wherein the thermoplastic polyolefin elastomer is an olefin block copolymer.

5. The composition of claim 1, further comprising a flexural modulus of greater than 2000 MPa, a Charpy impact strength of greater than 6 kJ/m$^2$, and a falling dart maximum force energy of greater than 4 J.

6. A composition comprising:
   (A) from 30 wt % to 94 wt % of a propylene component including at least one propylene-based polymer having a propylene content of at least 75 wt %, based on the total weight of the propylene-based polymer, and a melt flow rate of at least 10 g/10 minutes as measured by ISO 1133 at 230° C./2.16 kg;
   (B) from 1 wt % to 50 wt % of a carbon fiber component comprising of chopped carbon fibers sized with an epoxy- and phenoxy-based emulsion;
   (C) from 5 wt % to 69 wt % of a thermoplastic polyolefin elastomer;
   (D) from 0.1 wt % to 15 wt % of a maleic anhydride grafted polypropylene compatibilization agent that has a graft amount of maleic anhydride of 0.8 wt % and a melt flow rate from 300 to 700 g/10 min measured by ASTM D1238 at 230° C., 2.16 kg.

7. The composition of claim 6, wherein the thermoplastic polyolefin elastomer has a density from 0.850 g/cc to 0.875 g/cc as measured by ASTM D792 and a melt flow index from 0.1 g/10 minutes to 50 g/10 minutes as measured by ASTM D1238 at 190° C./2.16 kg.

8. The composition of claim 6, wherein the thermoplastic polyolefin elastomer is an ethylene/alpha-olefin interpolymer.

9. The composition of claim 6, wherein the thermoplastic polyolefin elastomer is an olefin block copolymer.

10. The composition of claim 6, further comprising a flexural modulus of greater than 2000 MPa, a Charpy impact strength of greater than 6 kJ/m2, and a falling dart maximum force energy of greater than 4 J.

11. The composition of claim 6, further comprising an average CLTE value of less than 5E−05 m/m/° C. via machine direction and an average CLTE value of less than 8E−05 m/m/° C. via transverse direction.

* * * * *